Sept. 25, 1956 S. E. RUSINOFF ET AL 2,764,238
MEANS FOR SUPPLYING POWER TO ROTATING SHEARING BLADES
Filed Feb. 15, 1954 4 Sheets-Sheet 1

Inventors:
Samuel E. Rusinoff,
Richard M. Schumacher,
By Charles J. Merriam,
Atty.

Sept. 25, 1956 S. E. RUSINOFF ET AL 2,764,238
MEANS FOR SUPPLYING POWER TO ROTATING SHEARING BLADES
Filed Feb. 15, 1954 4 Sheets-Sheet 2

Inventors:
Samuel E. Rusinoff,
Richard M. Schumacher,
By Charles J. Merriam,
Atty.

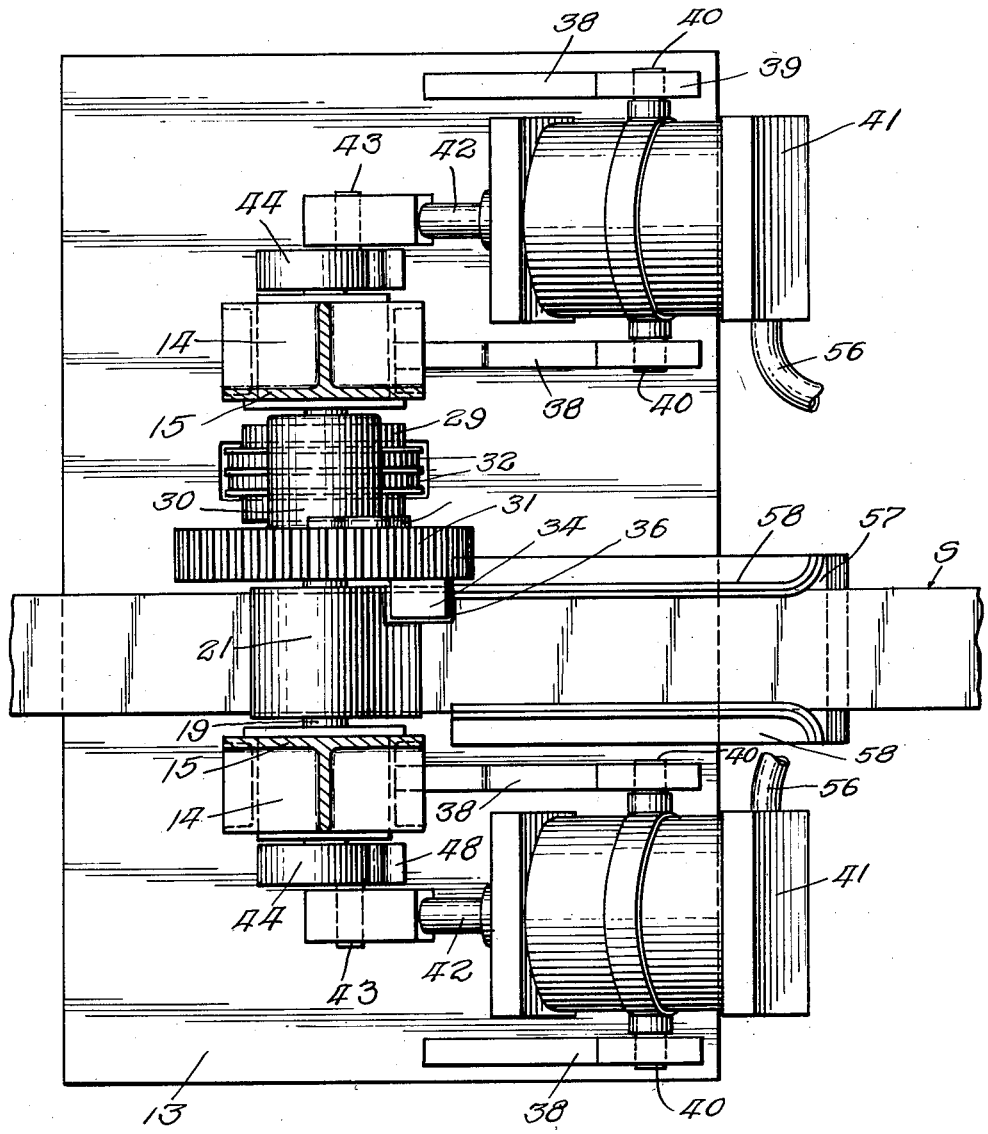

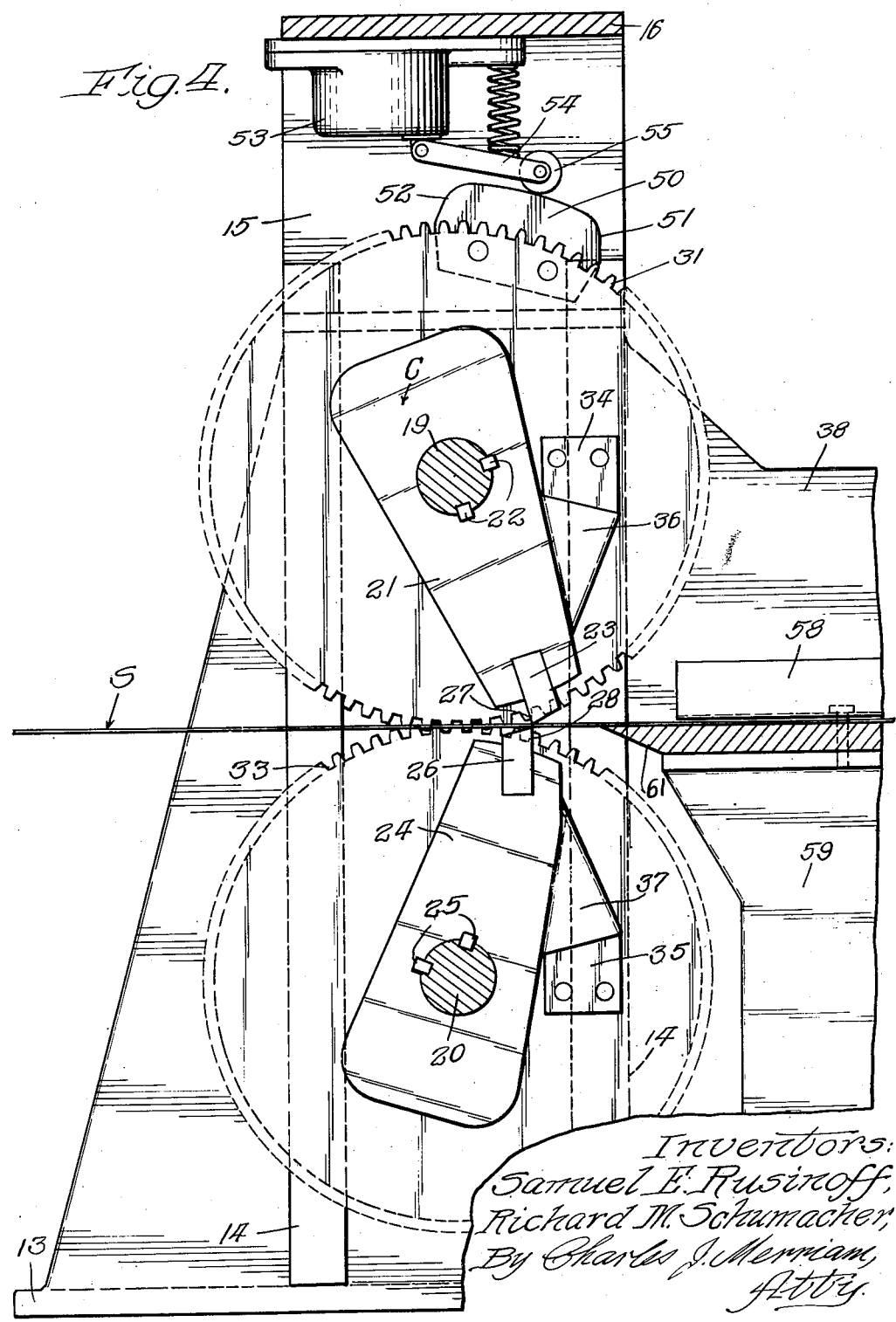

United States Patent Office 2,764,238
Patented Sept. 25, 1956

2,764,238

MEANS FOR SUPPLYING POWER TO ROTATING SHEARING BLADES

Samuel E. Rusinoff and Richard M. Schumacher, Chicago, Ill., assignors to Caine Steel Co., a corporation of Illinois Application February 15, 1954, Serial No. 410,263

9 Claims. (Cl. 164—66)

This invention relates to a metal shearing device and more particularly to a rotary shear intended to shear a strip of metal sheet material into shorter lengths as the strip moves past the shearing station.

The present invention provides a comparatively simple shearing mechanism in which the shearing blades are mounted on arms which rotate with a shaft. The blades thus rotate with the shaft and their cutting edges move into and through a strip of metal while moving in a horizontal path in the direction of movement of the strip of metal. The strip does not stop in its movement, that is, there is no interruption in the movement of the strip as it passes through the shearing station.

The mechanism employed involves the use of a novel means of supplying power to the shearing blades. Motive power is provided only during the shearing operation and is supplied in timed relation to the movement of a strip past the shearing station to vary the length of strip passing the station between shearing operations. A very effective mechanism is employed to maintain the alignment of the shearing blades and to return them to proper shearing relation although each blade travels in a circular path. In the particular embodiment illustrated and to be described, the shearing blades are carried or advanced from one shearing operation to the next by a drive obtaining its power from a variable speed motor for the rolls used to advance the strip past the shearing station. Preferably an air cylinder is connected with the blades in such a way as to provide the shearing force on the arms causing the blades to cut through the metal. After the cut has been made, this power is, in effect, turned off and the blades are continued in a rotary path to return them to the next shearing operation.

Particular features and advantages of the present shearing mechanism will be apparent from the following description taken in conjunction with the illustration of one embodiment in the accompanying drawings in which:

Figure 3 is a top plan view of the mechanism partially in section and taken substantially along line 3—3 in Figure 1; and Figure 4 is a fragmentary vertical sectional view of a portion of the shearing mechanism and taken substantially along line 4—4 in Figure 2.

Figure 1:
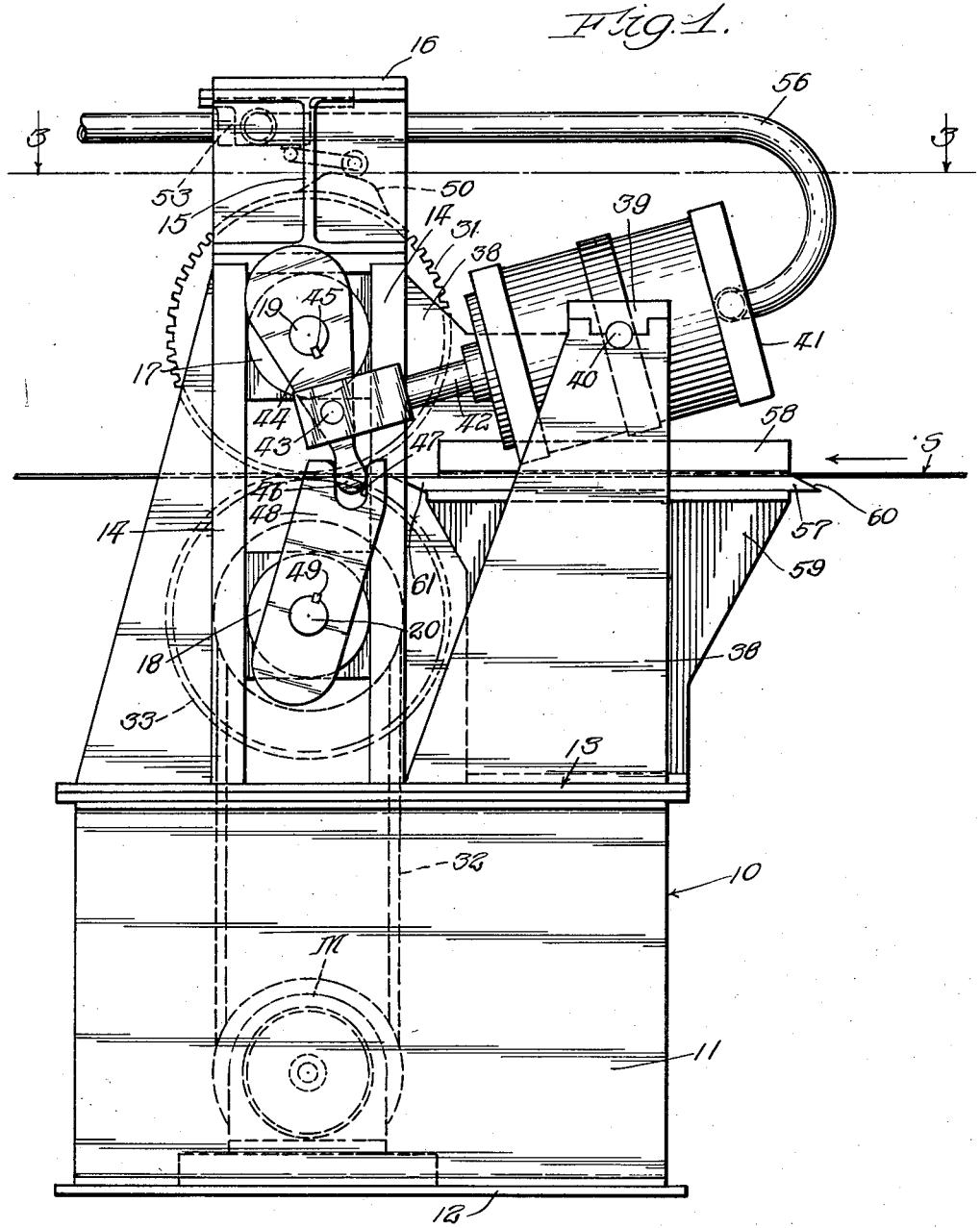
Figure 1 is a side elevation of a shearing mechanism constructed in accordance with the present invention.

The present shearing mechanism is intended for use primarily on sheet metal strips cut from rolls formed in the usual sheet mill of the primary producers. The strip may have widths varying from a fraction of an inch to any desired width. The present shearing mechanism is intended for operation on all such widths and upon thicknesses of metal up to any desired sheet gauge.

The shearing mechanism may be placed in continuous operation as a step following rolling of the edges of a strip. Thus, it is possible in one continuous operation to slit a wide strip of rolled material into narrower strips, edge roll the individual strips and then shear at least some of the strips into shorter, commercially saleable lengths.

The shearing mechanism itself is illustrated in the accompanying drawings as operable upon a strip S. The shearing mechanism is mounted on a relatively heavy base 10 formed of a pair of I-beam sections 11 with base plate 12 and a double top plate 13. A number of standards are mounted on top of the double top plate 13 so as to extend thereabove forming the support for bearings to hold the rotating shafts of the mechanism. One standard 14 is mounted at each outer side of the mechanism and is joined at their top ends 15 by a top plate 16 for rigidity. These standards 14 form the support for bearings 17 and 18 for an upper shaft 19 and a lower shaft 20 respectively. These shafts are positioned above and below the strip S and serve to support the shearing blades which act in unison to shear the moving strip.

The particular means for holding the shearing blades is illustrated best in Figure 4. An arm 21 is keyed by a pair of keys 22 to the upper shaft 19. This arm supports the upper shearing blade 23 mounted in its outer end. A similar arm 24 is keyed to the lower shaft 20 by a pair of keys 25 and also carries the lower shearing blade 26 adapted to cooperate with the upper blade 23 in shearing the material. The leading edge 27 of the upper blade passes immediately in back of the trailing edge 28 of the lower blade 26 to effect the shearing of the strip S which travels to the left as seen in Figure 4.

Figure 2:
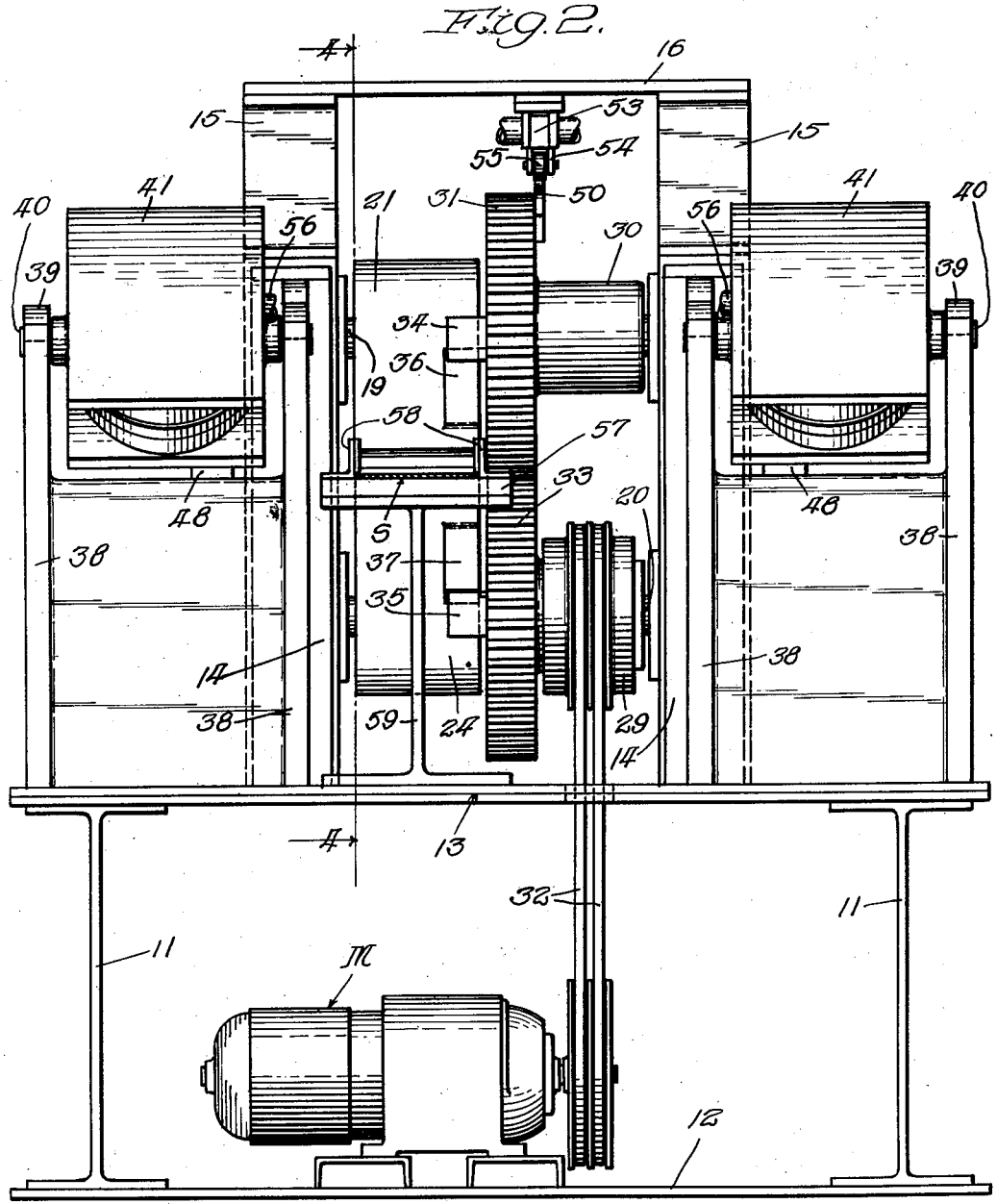
Figure 2 is a front elevation of the mechanism looking toward the direction of movement of the strip to be sheared.

The shearing mechanism is driven in timed relation to the movement of the strip through the shearing station. As illustrated in Figures 1 to 3, the lower shaft 20 is provided with a sheave 29 secured to the hub of a spur gear 33. The sheave is driven by a pair of belts 32 obtaining their driving power from a variable speed motor M. If desired, the drive may be from a strip advancing roll so that the speed of the gear 33 may be governed by the speed of the advancing rolls for propelling the strip through the shearing station.

The gear 33 is in mesh with a similar gear 31 mounted on the upper shaft 19. Both of these gears are freely rotatable on their shafts being provided with hubs 30 having bearings permitting such free movement. Each gear is provided with a one way driving connection to its blade arm, that is, each gear is provided with a block 34 and 35 respectively which extends laterally from the side of the gear for the purpose of engaging a triangularly shaped extension or block 36 or 37 respectively mounted on the two blade carrying arms. Thus, as the gears rotate under the influence of the belt drive 32, the driving blocks come into contact with the blade carrying arms and advance them each in its rotary path about the shaft upon which it is mounted to bring the arms around toward shearing position. The driving force required to carry out this amount of operation is relatively small since there is very little drag opposing the turning of the arms through their path prior to engagement of the blades with the strip. The one way driving connection permits the use of an independent overdrive for effecting shearing.

The shearing force, which may be quite large, is supplied independently of the belt drive 32 described for carrying the blades toward shearing position. On each side of the base top plate 13 is mounted a pair of upright standards 38, each mounting a bearing between the top of the standard and a cap plate 39 for receiving journals 40 pivotally supporting an air cylinder and piston device 41 on each side of the apparatus. The air cylinder in the particular embodiment illustrated is one of 12-inch diameter having a 10-inch stroke. These cylinders provide the necessary power to force the shearing blades through the metal strip without interrupting travel of the latter.

The force applied at the instance of shearing may be and preferably is applied through arms which serve to align the shearing blades in proper relationship. As best illustrated in Figures 1 and 3, the piston rod 42 of each piston and cylinder device is connected by means of a pin 43 to an aligning arm 44. This arm is keyed to the upper shaft 19 by a key 45. The outer end 46 of the arm is rounded so that it may pass into the slot 47 formed in a lower aligning arm 48 secured to the lower shaft 20 by a key 49. These aligning arms on each end of the upper and lower shafts being keyed to the shaft move along with the blade carrying arms 21 and 24. Any force applied to the aligning arms by the piston and cylinder device is applied through the aligning arm, the shaft, and the blade carrying arm to the blade itself. Proper alignment of the blades is maintained along with the application of the shearing force to the blades.

Shearing power is applied to the blades only during a short portion of the travel of each blade in its rotary path. At other times, the piston and cylinder device merely idle through the path required by their connection to the aligning arms. A triggering mechanism is employed to apply air pressure to the cylinders and force the blades through the metal strip. The upper spur gear 31 is provided on one side with a cam plate 50 having a leading outwardly sloped edge 51 and a similar downwardly sloped trailing edge 52. A three-way valve 53 has an operating arm 54 with a cam follower 55 adapted to ride over the surfaces of the cam plate. As best illustrated in Figure 1, air lines 56 lead from the valve to the piston and cylinder devices so that the valve may be shifted by an engagement of its arm with the cam plate to admit compressed air to the cylinders. As the cam follower rides off the trailing edge 52 of the cam plate, the cylinders are exhausted to atmosphere permitting their pistons to be carried along with the rotation of the spur gears returning the piston to proper position to again apply a shearing force to the blades.

In operation, the belt drive 32 rotates the spur gears permitting the bearing blocks to engage the blade carrying arms to bring them about in their circular path toward shearing position. The cam plate 50 is so positioned to open the three-way valve at the proper moment admitting air to the cylinders which operate the aligning arms to advance the blades through the metal ahead of the uniform rate at which the spur gears are rotating. Following this operation, the cylinders are exhausted and the spur gears catch up with the blade carrying arms so that the blocks again engage and advance the blades through their circular paths. The cycle is then repeated.

The strip S may be guided to the shearing blades by a guide table 57 having a side guide 58 on either side of the strip. The side guides may be moved laterally to accommodate different widths of strips. The table is quite heavy and may be supported by an I-beam section 59 resting on the base of the structure. The end 60 of the table first approached by the strip may be cut off at an angle so as to guide the strip upwardly over the table should it approach at a level below the table itself and the opposite end 61 may be cut off at an angle on the underside to provide clearance for the lower shearing blade and yet the strip will be given support quite close to the shearing position.

The length of strip to be sheared off may be varied by providing a proper relation between the sheaves on the belt drive and the rollers which are driven to advance the strip through the shearing station. This may be done, whether with a variable speed motor M or with direct drive taken from the strip advancing rolls. It is not necessary that the strip be stopped in its advance in order to permit a shearing operation. The shearing blades move forwardly through the strip S at a rate in excess of the advance of the strip so that the portion cut from the continuous strip will be pushed forwardly out of the way of the strip advancing to the station. In other words, the peripheral travel of the blades preferably is faster than the linear travel of the strip being sheared and therefore does not slow the speed of travel of the strip. The latter is cut without any stoppage or hesitation of its linear feed. The operation may be continuous with very little maintenance required of the shearing mechanism. The blades should be maintained in sharp condition and each blade carrying arm is provided in the usual manner with means for interchanging the cutting blades. The aligning and blade carrying arms may be provided with counterbalances C to permit a smaller motor M if desired.

The foregoing detailed description has been given for clearness of understanding only, and no unnecessary limitations should be understood therefrom, for some modifications will be obvious to those skilled in the art.

We claim:

1. Mechanism for shearing a moving strip of material into shorter lengths, comprising: a pair of blades mounted in cooperating position to shear a strip of material passed between them and for movement in the direction of travel of said strip; variable speed drive means for advancing the blades toward shearing relation; additional power means connected with at least one of the blades for overriding said drive means and forcing the blade through shearing relation with the strip; and triggering mechanism for energizing the additional power means in timed relation to the movement of the blades.

2. Mechanism for shearing a moving strip into shorter lengths, comprising: means for guiding a strip in a linear path; a pair of rotating blades, one above and one below the path of the strip, said blades having cooperating shearing edges; a one direction drive mechanism for advancing the blades at uniform speed each in its rotary path toward shearing contact with a strip; an air cylinder device connected with the blades for producing an overdrive shearing force and advancing the blades into the strip and forwardly at a rate in excess of said uniform advancing speed; aligning means for maintaining the blades in proper relative position during shearing movement; and triggering mechanism for energizing the air cylinder device in timed relation to movement of the blades.

3. Mechanism for shearing a moving strip into shorter lengths, comprising: a pair of shafts, one mounted above and the other below the path of a strip to be sheared; a shearing blade mounted on each shaft and having cooperating cutting edges movable in the direction of said moving strip; interconnected drive means on each shaft having means to advance the blades toward shearing position; aligning means in addition to said drive means on said shafts for maintaining the blades in proper shearing alignment; power means for forcing the blades through the shearing position independent of said drive means; and triggering means for energizing said power means in timed relation to the movement of said blades.

4. Shearing mechanism as specified in claim 3, wherein the aligning means includes an arm on each shaft, one of the arms having a rounded outer end portion and the other arm having a slotted outer end portion to receive said rounded end portion, said arms being movable simultaneously with said shearing blades.

5. Shearing mechanism as specified in claim 3 wherein said interconnected drive means comprise meshing gears, one on each shaft and each gear has a bearing block engageable with the adjacent shearing blade to advance the blade toward shearing position.

6. Shearing mechanism as specified in claim 3 wherein the triggering means comprises a cam and valve operated by the cam, said power means comprising an air cylinder and piston device energized through said valve.

7. Mechanism for snearing a moving strip into shorter lengths, comprising: a pair of shafts, one mounted above and the other below the path of a strip to be sheared; an arm secured to each shaft and carrying a shearing blade; a drive sheave freely rotatable on one of said shafts and a pair of meshing gears, one on each shaft, one of said gears being driven by said drive sheave; a bearing block on each gear adapted to engage the adjacent arm and advance the blades toward shearing position; a pair of aligning arms, one secured to each shaft to rotate with the shaft and blades and align the blades through the shearing operation; a piston and cylinder device connected to one of said guide arms to provide shearing force on the blades; and triggering mechanism for energizing the piston and cylinder device through the shearing operation.

8. Shearing mechanism as specified in claim 7 wherein, said triggering mechanism includes a valve for admitting air or fluid to the piston and cylinder device and a cam carried on one of said gears for operating the valve.

9. Mechanism for shearing a moving metal strip into shorter lengths, comprising: a pair of rotating cooperating shearing blades movable in the direction of movement of said metal strip, one on each side of the strip to be sheared; drive means for advancing the blades in their respective paths toward shearing position; additional power actuating means operatively connected with said blades to advance said pair of blades through a shearing operation under shearing pressure and in the direction of movement of said metal strip and at a speed in excess of the speed of said drive means; and means energizing said power actuating means as the blades approach shearing position.

References Cited in the file of this patent

UNITED STATES PATENTS

| | | |
|---|---|---|
| 91,742 | Hatch | June 22, 1869 |
| 1,176,575 | Langston | Mar. 21, 1916 |
| 2,432,497 | Behrens | Dec. 16, 1947 |

FOREIGN PATENTS

| | | |
|---|---|---|
| 297,820 | Great Britain | Feb. 14, 1929 |